July 27, 1965  M. F. CIEMOCHOWSKI  3,197,613
ELECTRIC FLUID HEATING DEVICE
Filed Feb. 15, 1962

INVENTOR.
Michael F. Ciemochowski
BY Robert B. Ingraham
AGENT

United States Patent Office 3,197,613
Patented July 27, 1965

3,197,613
ELECTRIC FLUID HEATING DEVICE
Michael F. Ciemochowski, Warren, Mich., assignor to The Dow Chemical Company, Midland, Mich., a corporation of Delaware
Filed Feb. 15, 1962, Ser. No. 173,570
4 Claims. (Cl. 219—307)

This invention relates to an apparatus and method for heating of viscous liquids. It more particularly relates to the uniform heating of a flowing stream of a viscous liquid by electrical means.

The heating of viscous liquids is extremely important in many operations, particularly in the extrusion of thermoplastic materials such as polystyrene, polyethylene, and the like into thin films. Any non-uniformity in the temperature of the material being extruded will result in a variation in the thickness of the product and lower the desirability of the finished product to the user. Also, in many cases, it is desirable to raise the temperature of a viscous liquid rapidly and maintain precise and exact temperature control as well as temperature distribution within the liquid body. This is not readily accomplished because of the high viscosity and low coefficient of heat transfer of such materials in contact with heat exchangers. Various high surface heat exchanger units have been designed to accomplish this object, and some have met with limited success. The construction of such devices involves much exacting machine work, welding, and brazing. When such devices are employed with many heat transfer liquids used to attain temperatures in the region of 200° centigrade, often failure of the welds and corrosion occurs.

It is an object of this invention to provide an improved apparatus and method for heating viscous liquids.

It is a further object of this invention to provide an apparatus for continuously heating a stream of viscous fluid and maintain a precise temperature control thereof.

It is yet another object of this invention to provide a heating apparatus which does not employ a liquid heat exchange medium.

It is still another object of this invention to provide an improved heating apparatus for viscous liquids which does not require complicated exacting machine operation or extensive welding and brazing.

These benefits and other advantages are achieved in accordance with the invention by providing a housing defining a chamber, said chamber having at least one generally radially disposed port and a generally axially disposed port, a conductive edge wound generally helical heater defining a centrally disposed passageway, said heater having a relatively narrow predetermined spacing between each turn, said helix being generally axially positioned in said chamber and spaced from the radially disposed walls thereof, said heater being adapted to convert electrical energy into heat.

The term "edge wound helix" as employed herein refers to a helix generated by the winding of an elongated member about a generally cylindrical surface, the elongated member having cross sectional minor and major dimensions. The minor dimension will be about parallel to the generally cylindrical surfaces of the helix.

These features and other advantages of the present invention will become more apparent when taken in conjunction with the following specification and drawing wherein.

Figure 1:
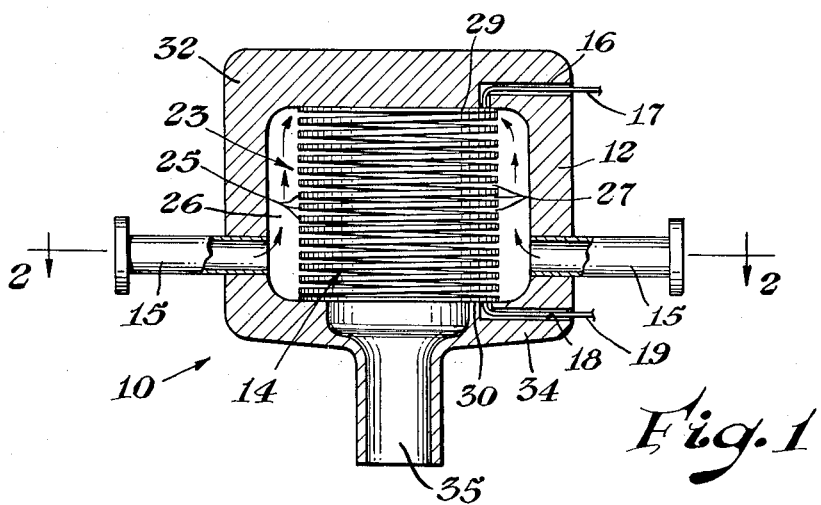
FIGURE 1 is a schematic cross sectional representation of a heating device in accordance with the invention.

In FIGURE 1 there is depicted a cross sectional representation of a heat exchanger 10 in accordance with the invention. The heat exchanger 10 comprises a generally cylindrical body section 12 defining a cavity 14 and inlet passageways 15. In the body 12 are formed a passageway 16 carrying an electrical conductor 17 and a passageway 18 carrying a second electrical conductor 19. Within the cavity 14 is disposed an edge wound helical conducting element 23, comprising a plurality of turns 25, each of said turns 25 being separated from each other by a space 27. Between the body 12 and the element 23 is an annular space 26. Disposed toward one end of the body 12 is a cap 32 and at the opposite end a cap 34. The cap 34 defines an exit passageway or port 35. The element 23 is separated from the end caps 32 and 34 by the insulating rings 29 and 30 respectively.

Figure 2:
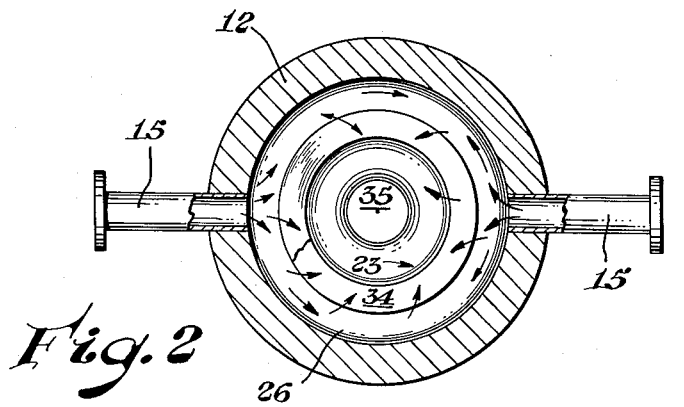
FIGURE 2 is a cross sectional representation of the apparatus of FIGURE 1 taken along the line 2—2.

FIGURE 2 depicts a sectional view of the embodiment of the invention shown in FIGURE 1 sectioned along the line 2—2. The body 12 is sectioned in a plane containing the inlets 15 and illustrates the relationship of the helical coil 23 and the annular space 26. The arrows depict one flow pattern of the viscous material through the heat exchange unit.

Figure 3:
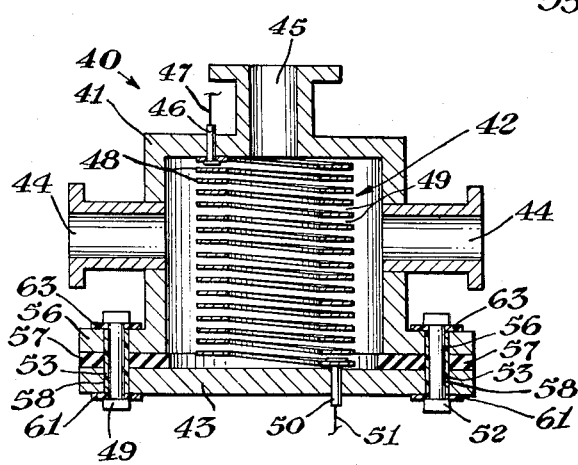
FIGURE 3 is a sectional view of an alternate embodiment of the invention.

FIGURE 3 depicts a schematic cross sectional representation of a heat exchanger generally designated by the reference numeral 40. The heat exchanger 40 comprises a body 41, an edge wound helix for heating 42, and an insulated head 43. The body 41 defines a pair of generally radially opposed inlet ports 44 and an axially discharge port 45. Axially disposed within the generally cylindrical body 41 is the heating helix 42 which is secured in electrical continuity to the body 42 by means of the connector 46. The connector 46 is in communication with a power supply means 47. The conductive helix 42 comprises a plurality of turns generally designated by the reference numeral 48, each of the turns 48 being separated from each other by a space 49. The end of the helix remote from connector 46 is secured in electrical communication with the flange 43 by means of a connector 50. The connector 50 is in electrical communication with a power supply means 51. The flange or head 43 is secured to the body 41 by means of a plurality of headbolts 52. The headbolts 52 pass through the openings 53 in the head flange 43 and the openings 56 in the body 43. Disposed between the body 41 and the head flange 43 is an insulating gasket 57. An insulating sleeve 58 is provided to separate the headbolts 52 from the body 41 and the head 43. The heads of the bolts 52 are spaced from the flange 43 by insulating washers 60 and the nut on the headbolts 50 are spaced from the body 41 by the insulating washers 63.

In operation of the invention as illustrated in FIGURES 1 and 2, a viscous liquid is forwarded into the annular space 26 from the inlets 15. The liquid flows around the outer surface of the helix 25 in the space 26. When the space 26 is filled with the viscous liquid, it is forced through the spaces 27 into the central portion of the chamber 14. An electrical current is applied to the conductors 17 and 19, and passage of the current through the helix causes heat to be produced therein. The viscous liquid passing over the helix through the spaces 27 serves to remove the heat from the helix. By controlling the magnitude of the current through the helix the temperature of the viscous liquid is quickly and easily controlled within close limits.

The operation of the embodiment of FIGURE 3 with regard to the flow of liquid is substantially similar to that of FIGURES 1 and 2. Electrically, however, it differs in that the body portion 32' and the head 34 are incorporated into the electrical heating circuit. This embodiment permits a simplified internal construction and does not subject the insulators to significant exposure to the hydraulic forces or chemical activity of the confined liquid. The insulating gasket 57 in the embodiment of FIGURE 3 is the only portion of insulating material which is exposed to the viscous liquid. It is securely clamped between the body 32' and the head flange 34. In this way the major portion of the insulating material remains away from the liquid being handled. The electrical problems employing this embodiment are greatly simplified in most applications, as the internal helix has a relatively low resistance it subsequently operates at a voltage which is usually well below the lethal level and in many instances therefore requires no external insulation for the protection of personnel. In such cases where such insulation may be desirable, usually a coat of paint or a similar protective coating is adequate.

Very precise and rapid temperature control of the viscous liquid flowing through a heat exchanger in accordance with the present invention is obtained. In sharp contrast to conventional heat exchange systems employing heat transfer liquids and vapors, the thermal inertia of the helical heating element is extremely low. Thus, by appropriate manual or automatic control of the current being passed through the helix precise temperature control is maintained. The temperature of the flowing liquid is very quickly raised or lowered (but not lowered below the temperature of the input liquid), as the heat generated within the helix is varied.

A wide number of conventional means are readily employed for the control of current within the helix. If direct current is employed, the generator output and the applied voltage are readily altered by changing the speed of the generator or inserting a resistance in series with the generator and the helical heating element. Beneficially, the heating of the helix is accomplished by means of alternating the current whereby the input is varied by means of tapped transformers or auto transformers. In cases where a relatively large heat dissipation will occur in the helix, such devices are saturable reactors, and transformers having variable coupling between the primary and secondary windings are beneficially employed. When such control devices are employed, the power input to the helix is varied so that the heat output of the helix is varied in almost an instantaneous manner.

Heaters in accordance with the invention are advantageously employed to heat a wide variety of viscous liquids such as molten thermoplastic materials such as polystyrene, polyethylene, polypropylene, condensation of polymers of such as those formed from adipic acid and hexamethylene diamines and the like. Similarly, greases, oils, and other gel-like materials as well as less viscous materials such as low boiling oils, solvents, and the like are readily heated.

The relative dimensions of the edge wound helix will vary with the particular conditions for which the heater is designed. Generally, in order to obtain adequate rigidity of the heating element within the chamber, it is beneficial to employ a helix whose turns have a thickness to width ratio of about 1 to 4 and beneficially, where a minimum resistance to flow is required, a thickness to width ratio of 1 to 15 or even greater is employed.

Also, for the purpose of descriptive convenience, the apparatus in accordance with the invention has been described as having generally radial inlet ports and axial outlet ports. As is obvious to one skilled in the art of fluid flow, the direction of flow to a liquid through such an apparatus is not critical for many applications, and the fluid may enter axially and leave radially or flow in the reverse direction, and the heat transfer and control will be equally as efficient. When utilizing exceptionally viscous fluids such as molten polymeric substances at temperatures only slightly above their solidification point, the use of axial feed substantially eliminates unbalanced forces on the helical heating element.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A heat exchanger comprising
   a housing defining a chamber having an inner wall, said chamber having at least one radially disposed port and one generally axially disposed port, the radial direction and axial direction being with reference to the axis of
   a conductive, edge wound, generally helical electrical heater,
   said heater being a helically disposed conductive ribbon having a thickness less than its width,
   said heater defining a centrally disposed passageway, said heater having a relatively narrow predetermined spacing between each turn thereof,
   said helical heater being positioned in said chamber and in spaced relationship to the wall thereof,
   a space being defined between said heater and said wall, said radially disposed port being in direct communication with said space and said axially disposed port being in direct communication with said passageway, said helical heater being supported by only the terminal portions thereof and supported between said radially disposed port and said axially disposed port and said heat exchanger being so constructed and arranged that fluid passing from radial to an axial port flows through the turns of said heater.
2. The apparatus of claim 1, wherein said helical heater is in communication with an electrical power source.
3. The apparatus of claim 1, in operative communication with the supply of a viscous liquid.
4. The apparatus of claim 1 wherein said housing is provided with at least two radially disposed inlet ports and a generally axially arranged outlet port.

References Cited by the Examiner
UNITED STATES PATENTS

| | | | |
|---|---|---|---|
| 1,226,319 | 5/17 | Dyer | 219—206 |
| 1,478,415 | 12/23 | Wiegand | 219—381 X |
| 2,139,777 | 12/38 | Skok et al. | |
| 2,635,174 | 4/53 | Kasten | 219—201 |
| 2,925,329 | 2/60 | Yost | 219—273 X |

RICHARD M. WOOD, *Primary Examiner.*
ANTHONY BARTIS, *Examiner.*

UNITED STATES PATENT OFFICE
CERTIFICATE OF CORRECTION

Patent No. 3,197,613                           July 27, 1965

Michael F. Ciemochowski

It is hereby certified that error appears in the above numbered patent requiring correction and that the said Letters Patent should read as corrected below.

Column 1, line 24, for "exchangers" read -- exchanges --; column 2, line 31, for "42" read -- 41 --; line 50, for "60" read -- 61 --; same column 2, line 69, and column 3, line 5, for "32'", each occurrence, read -- 41 --; column 2, line 69, and column 3, line 5, for "34", each occurrence, read -- 43 --.

Signed and sealed this 9th day of August 1966.

(SEAL)
Attest:

ERNEST W. SWIDER                                   EDWARD J. BRENNER
Attesting Officer                                       Commissioner of Patents